Jan. 21, 1930. E. S. HALSEY 1,744,632
HEATING SYSTEM
Filed Dec. 7, 1927 3 Sheets-Sheet 1
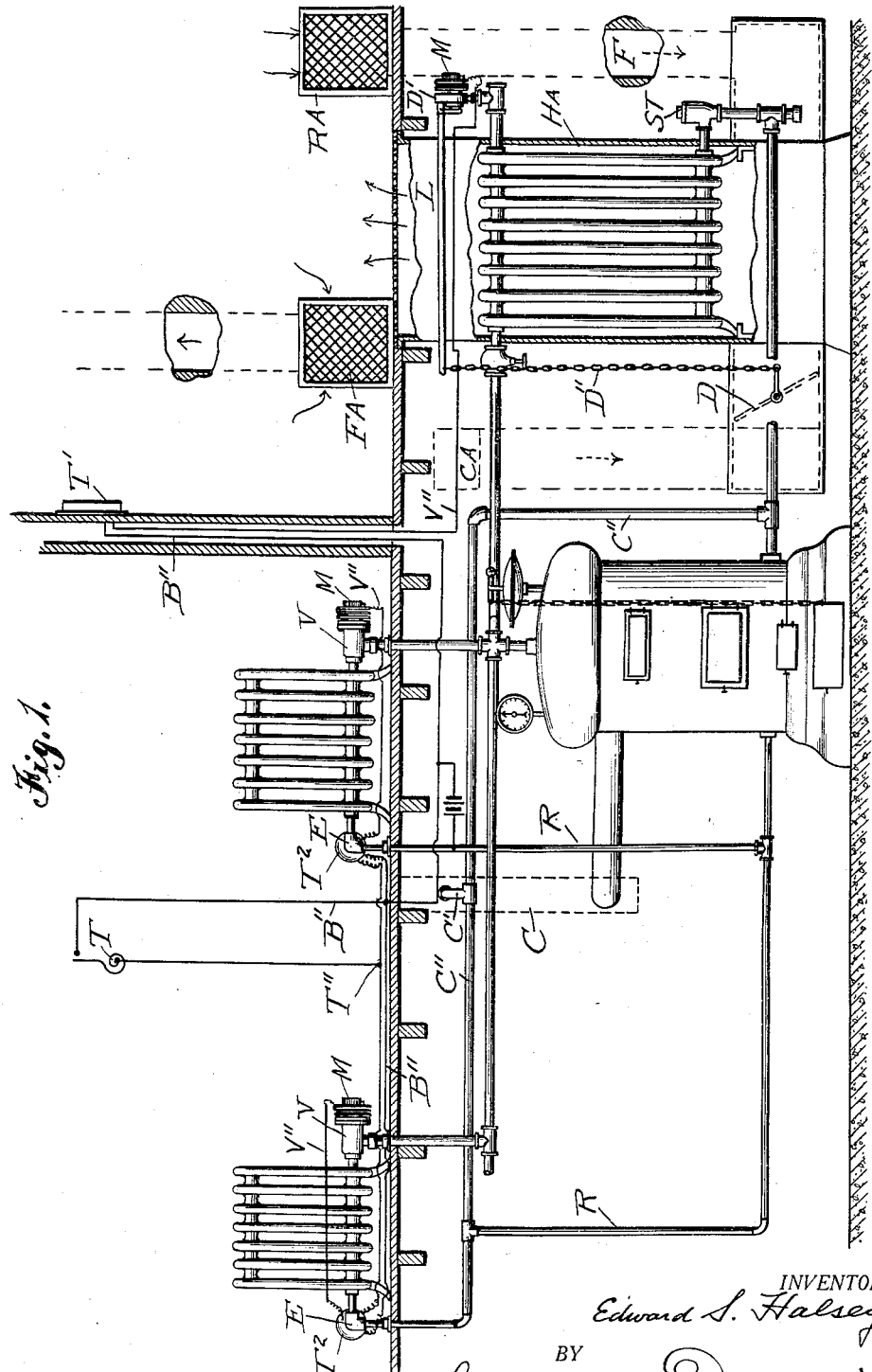
INVENTOR.
Edward S. Halsey
BY
Spear, Middleton, Donaldson & Hall
ATTORNEY.

Jan. 21, 1930.  E. S. HALSEY  1,744,632
HEATING SYSTEM
Filed Dec. 7, 1927   3 Sheets-Sheet 2
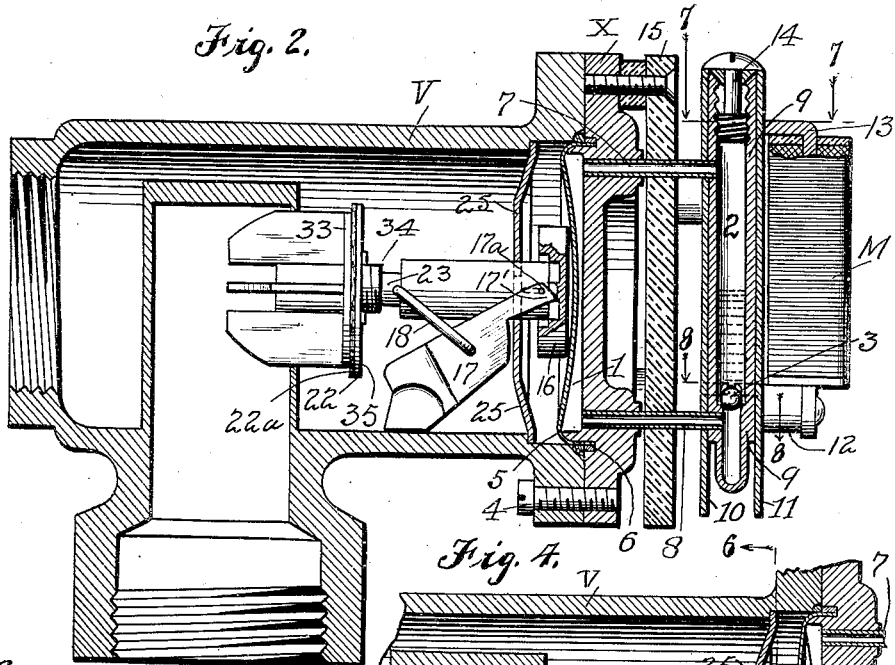
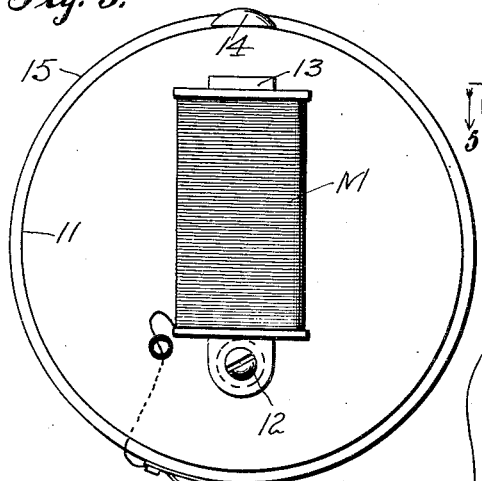
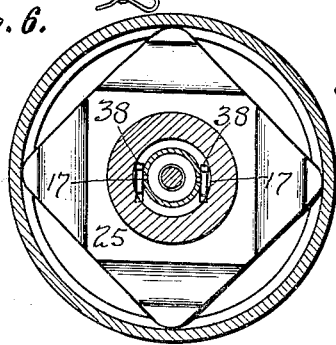
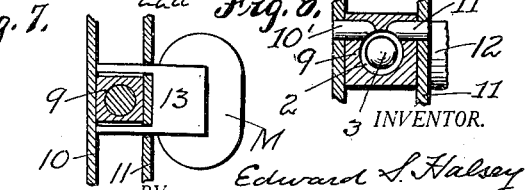
INVENTOR.
Edward S. Halsey
BY Spear, Middleton, Donaldson & Hull
ATTORNEY.

Jan. 21, 1930.  E. S. HALSEY  1,744,632
HEATING SYSTEM
Filed Dec. 7, 1927   3 Sheets-Sheet 3
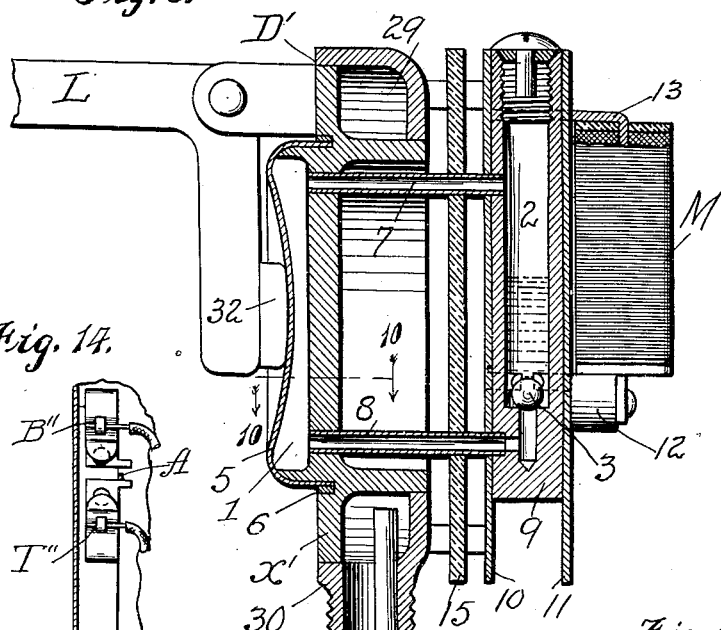
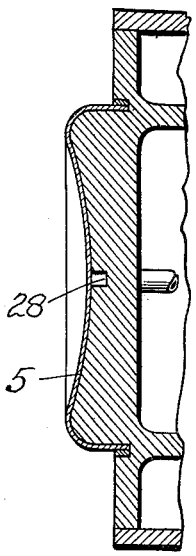
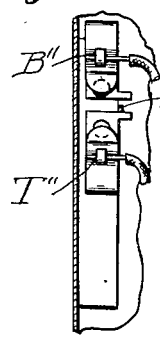
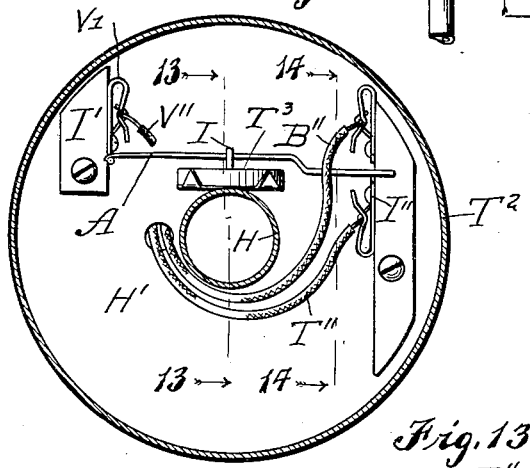
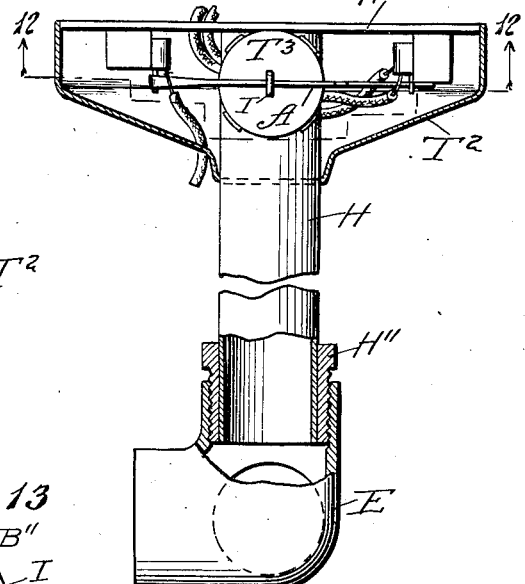
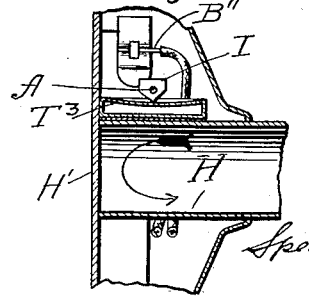
INVENTOR.
Edward S. Halsey
BY
Spear, Middleton, Donaldson & Hill
ATTORNEY.

Patented Jan. 21, 1930

1,744,632

UNITED STATES PATENT OFFICE

EDWARD S. HALSEY, OF WASHINGTON, DISTRICT OF COLUMBIA

HEATING SYSTEM

Application filed December 7, 1927. Serial No. 238,322.

This invention relates to a new automatic thermo-electric system of steam and air disposition, and automatic apparatus for its control.

By the system herein disclosed each radiator may have a perfectly free unobstructed discharge for both air and water at all times, and may utilize the entire radiation at maximum temperature when required, and upon the first gush of live steam passing from it to the return line, the automatic valve on the supply end is cut off, actuated by a sensitive electric thermostat or switch externally fixed to the return fitting.

The nature of these supply valves which also control the room temperature by means of a single contact electric wall thermostat in each room are in some respects similar to those shown by my Patents No. 1,285,990, and No. 1,285,991, of November 26, 1918, also by my Patent No. 1,312,113 of August 5, 1919. My present invention embodies notable improvements. One important feature is the sensitive electrical control of the alcohol which actuates the working diaphragm by means of which a valve of any size or power may be actuated by the expenditure of less than 1/20th part of one watt, and by a temperature change of less than 1° F.

Other important features of improvement will be clear from the following disclosure.

One object of my present invention is to provide a convenient, simple and efficient electrical control of a group of radiators from a simple contacting wall thermostat and by a simple circuit system, and from a thermo-electric contactor attached to the return end of each radiator to cause any radiator of the group to momentarily close its individual supply valve every time live steam starts to overflow from it to the return line, thus eliminating troublesome and expensive return traps.

Other objects will be made manifest by the following specifications.

In the accompanying drawings which illustrate this invention, similar reference characters refer to similar parts throughout the several views.

Figure 1 is a diagrammatic lay-out of the system.

Fig. 2 is a central vertical section of my steam control valve organization with parts in elevation, the valve being in open position.

Fig. 3 is a front elevation of the bonnet end of Fig. 1.

Fig. 4 is a fractional section showing the valve in closed position.

Fig. 5 is a fractional plan view of Fig. 4.

Fig. 6 is a cross section on line 6—6 of Fig. 4.

Fig. 7 is a sectional detail of Fig. 2, on line 7—7.

Fig. 8 is a sectional detail on lines 8—8 of Fig. 2.

Fig. 9 is a sectional view, partly in elevation, of a modification of the valve actuating mechanism.

Fig. 10 is a fractional section on line 10—10 of Fig. 9.

Fig. 11 is a plan view in partial center section of return end fitting, and the thermostatic cut-out, or switch.

Fig. 12 is a sectional view of Fig. 11 on line 12—12, exposing its thermostatic elements and circuit connections to view.

Fig. 13 is a fractional cross section on line 13—13 of Fig. 12, through the thermostatic wafer, and the outer end of the heating tube.

Fig. 14 is a sectional view of Fig. 12 on line 14—14 showing the alternate thermostat switching points and contacting arm.

Referring to the detail of parts of the various elements of this system, main valve body V, which is attached to the inlet end of the radiator, is fitted with a detachable bonnet X, secured by a series of screws 4. A hot diaphragm chamber 1 is provided within said bonnet by the flanged diaphragm 5, sweated into a circular groove 6 in its face. Top and bottom heat insulating tubes of German silver, 7 and 8, lead back from said hot chamber to a cold chamber 2, which is provided by a vertical bore in a square brass column 9. Concentrically attached to said column are cooling plates, 10 of iron, and 11 of brass. In the bottom portion of said column 9, concentric with its bored chamber 2 is a smaller counter bore, the sharp upper shoulder of which forms the seat for the magnetic ball valve 3. Two iron studs 10' and 11' pierce said column from the back and front sides, and these are offset relative to its center chamber, as shown in Fig. 8. The stud 10' makes magnetic connection with the iron plate 10, and stud 11' pierces brass plate 11, and makes magnetic connection with a magnetic pole piece 12 of high resistance magnet M, which has a flat iron core 13, the bottom end of which is screwed to said pole piece. The top end of said core is bent back and forked so that its two prongs can be passed back through holes in plate 11, and make magnetic connection with iron plate 10, by straddling the center chamber column 9. Between the hot bonnet and cooling disc 10 is fixed an insulation disc 15, acting as a heat shield.

Alcohol is introduced to the cool chamber 2 by a medicine dropper. Then it is sealed by a beveled screw 14. Current is then passed through the magnet, raising trigger valve or ball 3, allowing the alcohol to flow freely into the hot chamber 1. Then after standing a few moments the entire composite pressure chamber is purged of air by easing off the sealing screw 14 a few times, whereupon the mechanism will then be in good operating condition.

Whenever and so long as the ball valve is raised by energizing the magnet, the alcohol flows freely into the hot diaphragm chamber, dilating the diaphragm 5, to the position shown in Figs. 4 and 5, by its vapor pressure of about 20 lbs., thereby pushing the valve actuating plunger 16 forward to close the valve. As may be noted by comparing the two extreme positions shown in Figs. 2 and 4, the first portion of said plunger's travel is expended against the points 17' of the short arm of the weighted forked lever 17, fulcrumed on a sliding pin or pins $17^a$ moving in slots 21, and fixed to a collar 19 slidably mounted within a guide tube 24 which is fixed to a rectangular spider or plate 25 which is fitted into the valve casing. The slots 21 allow the pins with the collar to move lengthwise of said fixed guide tube, resisted by a compressed spring 20 bearing at one end upon the inturned end or flange $24^a$ of the guide tube, and at its outer end pressing upon the collar 19, and hence the tendency of this spring is to hold the collar back so that the pivot pins $17^a$ will occupy a position at the outer ends of the slots as in Fig. 2. The lever link arm 17 is connected with the stem 23 of the steam inlet valve 22 by a bail or wire link arm 18 pivotally connected to said parts. The stem of the valve is hollow and is slidable within the spring and guide tube 24. A guide rod extension 16' of the plunger head 16 is loosely fitted within said hollow valve stem and through collar 19 allowing said plunger free movement.

The tension of the spring 20 is such that it will resist movement of the collar 19 initially; that is to say, when the pressure of the plunger 16 on the points 17' of the weighted lever 17 first takes place; hence in this initial movement of the plunger the pivot pins will be prevented from sliding back in the slots 21 and therefore this initial movement or the first part of the movement of the plunger 16 will result in rocking the lever 17 upwardly from the position shown in Fig. 2, to the position shown in Fig. 4, this result being due to the plunger acting on the short arms or points 17' of the forked lever 17. The upward swing of the lever results in a quick and augmented movement of the valve 22 towards closed position, this being due to the toggle action of the lever arm 17 and the wire link arm 18 in moving from their angular relation shown in Fig. 2 to their relatively straightened and interlocked position of Fig. 4. It requires but a slight movement of the diaphragm 5 to straighten said arms and loosely seat the valve 22, owing to the movement of the plunger 16 being multiplied by the toggle link connections 17 and 18. The latter link 18 has some elasticity and the valve is provided with seating disc 22 of a yielding material to get a good closing joint under compression. The final compression is due to the plunger 16 continuing its closing movement under the full pressure of the diaphragm after the actions above described have taken place. This final movement is slight, it being only necessary to get a firm seating of the valve. In this final action the members 17 and 18 move leftward as a body, for which purpose the pivot pins $17^a$ move in the slots of the guide tube 24, the spring 20 yielding under the increase of pressure from the collar 19.

The mechanism just described is constructed as a unit to be handled as one body in placing or removing it.

Whenever the magnet is de-energized the ball valve drops onto its seat and within a very few minutes all the alcohol will have evaporated from the diaphragm chamber and condensed within the air-cooled chamber 2, having passed over through the upper insulating return tube 7, whereupon the diaphragm will snap back, releasing the locked valve stem, allowing the weighted lever to drop and drag back the valve away from its seat by the elbow wire link 18.

It will be understood that the phosphor bronze diaphragm 5 is quite thin and flexible, so as to support it and protect it from mechanical injury from rough handling when the bonnet is detached from the valve body, I have formed a raised boss 27 integral with the bonnet, and similar in shape to the collapsed diaphragm, so as to completely fill and support the latter against bruising. To assure a free flow of alcohol and its vapor throughout the diaphragm chamber, while collapsed, I have cut the vertical channel 28 in the face of said boss. See Figs. 4 and 5.

The cast valve head 33 is formed with a slotted projecting hub 34, which is externally threaded so that the plastic valve disc 22$^a$ may be readily and firmly clamped to the head by the threaded follower disc 35. This hub is internally threaded to form an adjustable connection with the threaded valve stem 23. The slot 37 (see Fig. 5) is provided in said hub for lock pin 36, which is inserted and secured in the hole through the valve stem, after its desired adjustment has been secured.

Slots 38—38 are provided in the supporting spider 25 (see Fig. 6) for the movements of forked lever 17.

The thermostatic action of the damper-lever actuating mechanism, shown by Figs. 9 and 10, is identical with that actuating the valve above described. The latter differs only in the manner of supplying heat to the casting X', and in that, the latter expends its diaphragm action against a lever-pad 32, instead of against a valve seating mechanism.

The manner chosen for supplying heat to the latter is a steam channel 29 around casting X' formed by a ring casting 30 fitted around it and having at the bottom a threaded nipple for insertion to a steam pipe; also to facilitate the displacement of air from the steam ring, a short tube 31 is incorporated in the unit.

Referring to the detail of the return pipe thermostat shown by Figs. 11 to 14, for attachment to the return end of the radiators to overcome the necessity for steam traps; H is a short, substantially horizontal, heat insulating tube preferably of thin German silver. This is sealed at the back end by a large cooling disc H' sweated to it. Its other end is fitted with a threaded bushing H" for attachment to the radiator return elbow or fitting E, mounted at its back end in close thermal association with it, and adjacent said cold plate H' is a small thermostatic wafer T$^3$, adjusted to actuate the switching arm A up and down somewhere between 160° and 180° F., preferably with a snap action, but this is not essential as the operating time or temperature of this element is not very critical on account of the great temperature change at the location of this thermostatic element, the latter could conveniently be made of a conventional bi-metal type instead of the alcoholic wafer type shown.

The switch-arm A with its spring connector V$^1$ is mounted on an insulating block I', and connected by the conductor V" with the magnet wire terminal from the valve end of the radiator.

When the radiator is at its maximum temperature and completely filled with steam with no live steam passing out of the return fitting E, the back end of tube H is about 110° F., but upon the first passage of live steam to said fitting the air and vapor is discharged from tube H by live steam, by virtue of its greater lightness, and the temperature at the back end of said tube is raised about 100° F. or to about 210° F., whereupon the thermostat T$^3$ pressing up on the insulating piece I, and its switching arm, disconnects the magnet wire V" from the wall thermostat connection T" and connects magnet wire V" directly with the battery wire B" for a few minutes, closing the supply valve 22 until air has again filled said heating tube H, whereupon said tube H is rapidly cooled down, restoring the normal circuit connection T", V", and placing the inlet valve controlling mechanism under control of the room thermostat.

To house and protect this thermostatic switch and its circuit connectors, the sliding canopy T$^2$ is conveniently adapted.

The directing of this tube H straight back to the wall of the room provides a convenient, sightly and substantial conduit for leading the connecting wires from the baseboard to the radiator.

This heating tube H functions satisfactorily in any position so long as its closed end is not lower than its mouth, but I prefer to use it horizontally directed, as shown.

The operation of this system is illustrated by Fig. 1, which shows a complete heating system with a basement steam plant, and two upper heated rooms, the one to the left being directly heated by two conventional radiators, and the one to the right is indirectly heated by a vertically encased radiator below the floor, showing how various portions of a building may be optionally heated either directly or indirectly by the same heating plant and simultaneously ventilated under thermostatic control by means of my very flexible and simple and sensitive electric control, actuated by a two or three cell battery, or a common bell transformer at a negligible maintenance cost.

The said vertical radiator casing H—A discharges its draft of heated air to the room above and is connected at the bottom to a built-in flue F, with a re-circulating air outlet R—A leading from the bottom of said room, and also by a cold air duct, C—A, with the outer atmosphere; the latter duct is controlled by damper D, actuated through the chain D" and lever L, by the diaphragm movements of the thermo-electric mechanism D'. This mechanism is shown in Fig. 9.

Whenever the room temperature rises a fraction of a degree, above the setting of the wall thermostat T', it closes the battery circuit through the lead wire V" and the trigger magnet M of the thermally actuated diaphragm mechanism D', which in turn raises the lever L, opening the damper D, to duct H—A, admitting fresh cold air from without the building, causing foul air to be discharged from the room through opening F—A.

In the direct radiation portion of the system, I prefer to use the arrangement shown, consisting of a group of radiators controlled as to room temperature by a wall thermostat T reacting on the radiator supply valves V and V, at the desired room temperature, in preference to using the steam trap S—T shown as applied to the indirect radiator.

With the "direct radiators" are shown side outlet elbows E and E, freely connecting them with the return lines R and R to the boiler. Into said side outlets are screwed the short pipe thermostats T² and T², involving pipes H as before described, projecting back close to the wall, from which enters the three electrical conductors, leading to the terminals of a two-contact thermostatic switch within the canopy of each.

The leads V" and V" from the magnet coils M and M connect directly with the switch arms, which normally lie in contact with the terminals I" connecting to the thermostat wire T"; consequently whenever the room temperature rises to normal and thermostat T contacts with the battery wire B", current passes through the magnet coils to the piping system to which the inner ends of said coil are grounded, and the steam is shut off until the circuit is again opened by said thermostat.

However, should either radiator at any time begin to discharge live steam through its return fitting E before the room was sufficiently warm to close said wall thermostat, then the live steam will displace the air from the dead end of the pipe thermostat and momentarily switch said magnet connection directly into contact with the battery wire connection, shutting off the steam supply until said return fitting and dead end pipe have again filled with air and cooled sufficiently to disconnect from the battery wire.

While I have shown the return lines of this system freely vented to the chimney flue C at point C' by the pipes C", which creates a moderate suction on the return, it is obvious that it could be vented by any other suitable means.

It will be seen from the above that whether the thermo-electro-magnetic device controls the inlet valve to the radiator, or the damper D, in either case the heating effect of the radiator is controlled; in the one case by cutting off the steam and turning it on, and in the other case by modifying the passage of air to the radiator, the ultimate being in either case, the control of the temperature of the room.

In other words, my attachment controls a heat dominating valve whether this is used in connection with a radiator or other heater, and without regard to whether the valve is of the form shown for controlling a steam supply, or in another form, such for instance as a damper.

In the operation of the system a vapor pressure of about 20 lbs. for closing the valve or operating the damper is instantly generated, at any desired room temperature, within a sealed hot diaphragm-chamber by means of the sensitive trigger action of a small magnetic ball valve, consuming only 1/20 of a watt per valve, actuated by a distant thermostat.

The lifting of this hermetically sealed-in ball, when the group wall thermostat closes its circuit, allows a small charge of alcohol to freely flow from an air cooled chamber of each valve fixed outside its bonnet, into the hot diaphragm-chamber within said bonnet, thereby generating said vapor pressure expanding the diaphragm.

As long as the ball remains suspended, allowing all condensation of alcohol to return freely to the hot chamber, the diaphragm pressure will hold the steam valve closed.

As soon, however, as the room temperature falls a fraction of a degree below the setting of the wall thermostat, the external magnet-coil circuit will be opened, dropping the ball to its seat, preventing further condensation from returning to the diaphragm-chamber and accumulating it rapidly in the outer cooled chamber, so that within about two minutes the diaphragm-chamber will become dry and collapse, turning the steam on again.

Where any element shown herein in connection with one form of the apparatus is susceptible of incorporation in another form, it is to be regarded as though present in said other form. For instance, the bonnet of Fig. 2 can be replaced with the bonnet of Fig. 9 with its steam heating channel.

As before stated, the cooled chamber is in the form of a column square in cross section. It has a cylindrical bore, the axis of which is vertical, so that a comparatively small quantity of expansible fluid will provide a column of considerable height above the pipe or port 8. The ball valve lends itself for efficient use in this situation, for as shown, it takes up little room and being operated by the electro-magnet, the latter can be located entirely outside the bore of the cool chamber, leaving the interior of the cool chamber entirely clear, to be occupied by the column of fluid. This cool chamber is horizontally in line with the axis of the hot chamber and in the form shown in Fig. 1, the steam inlet valve, hot chamber, cooling chamber and electro-magnetic operating means are all in the same horizontal plane. While any suitable volatile liquid may be used, I prefer to use wood alcohol with a small acetone content to secure maximum pressure and effect.

To secure the best practical results with the steam valve herein described, particularly if it is to be used on a one pipe job, the actuating diaphragm should be constructed similar to that herein shown, preferably of a plain dished spring plate of phosphor bronze normally concaved when collapsed so that the actuating pressure required to force it past center to its distended convex or arched position is appreciably greater than that required to hold it distended. And conversely, its arched resistance to collapse should be sufficient to require a considerable diminution of internal pressure to break down said arched position in the process of collapse; with the resultant reaction, from its changing form and spring effect, that the interior pressure acting on the condenser during the collapsing cycle will be as great or greater towards its final stages of collapse as at its initiation, upon the breaking down of said arch.

And conversely, during the dilating cycle the initial internal pressure reacting on the condenser will be as great or greater than that necessary to fully distend the diaphragm and hold the valve on its seat.

Otherwise if a common diaphragm not having these structural properties were used, the resultant effect in closing will be objectionably sluggish.

And more especially in opening there will be an extended period when the valve will remain loosely or indefinitely seated, causing cutting, water accumulations and gurgling, while the condenser is slowly reducing the internal pressure, which period, with this unfavorable construction, is greatly extended from the fact that with each slight recession of internal pressure condensation is arrested until the temperature of the condenser has dropped still further, thus resulting in an extended hesitating action; whereas with my preferred diaphragm construction as shown, the final collapsing condensing pressure is considerably greater than at the start, resulting in a very rapid opening of the valve when once started.

The ball valve operated electro-magnetically lends itself for use advantageously in the combination disclosed herein where on the one hand it is desired to use a weak current that can persist economically during the time that it takes for the temperature at the thermostat to change, and on the other hand must remain open long enough to make the closing of the valve persist a sufficient length of time to bring the temperature of the radiator down for lowering the temperature of the room. So long as the ball valve is open the volatile fluid will flow from the cool chamber to the hot chamber and in the form of vapor from the hot chamber back to the cool chamber where it will condense and pass through the circuit again, thus keeping the steam valve closed. The ball valve must remain open for the performance of this action and hence unless a weak current could be used for opening the ball valve the result would be uneconomical to just that degree that a stronger current would be used.

I do not limit myself to a hot chamber of the form shown as said hot chamber may be made up of a compartment into which the liquid flows and from which vapor passes into a second compartment having a diaphragm or diaphragms from which the vapor passes back through the first mentioned compartment to the cool chamber.

The magnetic ball valve is claimed in application filed by me, Serial No. 333,673, January 19, 1929.

I claim:

1. In combination, a heat dominating valve, a hot chamber having a diaphragm for operating said valve, a cool chamber arranged substantially in line with the horizontal axis of said diaphragm, an inlet to the lower part of the hot chamber from the lower part of the cool chamber, a valve controlling said inlet, automatic means including a thermostatic device for controlling said valve and a return port leading from the upper part of the hot chamber to the upper portion of the cool chamber, said cool chamber containing an expansible fluid to be supplied through the valve to the hot chamber from which it passes back to the cool chamber through the return port, substantially as described.

2. Apparatus according to claim 1, in which the cool chamber is spaced apart from the hot chamber with an air gap between them, substantially as described.

3. Apparatus according to claim 1, in which the hot chamber and cool chamber are centrally located in respect to the axis of the heat dominating valve.

4. Apparatus according to claim 1, in which the cool chamber is separated from the hot chamber by an air gap with a shield intermediate said chambers of heat non-conducting material.

5. Apparatus according to claim 1, in which the cool chamber has an air vent at its upper end with a closure therefor.

6. In apparatus of the class described, a heat dominating valve, thermal means for controlling said valve including an expansible chamber, and electro-magnetic means for controlling the operation of said thermal means, and a thermostat controlling a circuit in which said electro-magnetic means is located.

7. In combination with a radiator, an inlet valve for steam, a return connection leading from said radiator, a substantially horizontal pipe section extending from said return connection, a chamber supported at the free end of said pipe having a cooling plate of comparatively large diameter, a thermostat in said chamber, a circuit controlled thereby, and a valve at the inlet end of the radiator with controlling means therefor in said circuit, substantially as described.

8. In combination with a radiator, a valve controlling the inlet of steam thereto, an electro-magnetic device for controlling said valve, a room thermostatic circuit closer, a thermostatic circuit closer subject to the temperature of the return connection leading from the outlet end of the radiator and in circuit with the room thermostatic circuit closer, the circuit closer at the return connection cutting out the room thermostat and cutting in the battery direct to said electromagnetic device upon a rise of temperature to a prescribed degree at the said return connection, substantially as described.

9. In combination, a group of radiators, each having a heat dominating valve with electro-magnetic means for controlling said valves, a thermostatic circuit closer common to and controlling simultaneously the said electro-magnetic devices of all the radiators, a thermostatic circuit closer individual to and located at the return connection of each radiator subject to the temperature at said connection, each of said individual thermostatic circuit closers controlling the valve of its own radiator under a prescribed temperature at its return connection, substantially as described.

10. In combination with a radiator, a valve at the inlet end thereof movable horizontally, a hot chamber having a movable diaphragm as one wall arranged coaxially with the valve, a cool chamber arranged in line horizontally with the hot chamber, an inlet connection to the hot chamber from the lower part of the cool chamber, a connection between the upper part of said chambers for the return of expansible fluid from the hot chamber to the cool chamber, and a valve controlling said inlet connection, substantially as described.

11. In apparatus of the class described, a heat dominating valve, a hot chamber having a movable diaphragm as one wall for operating said valve, a cool chamber arranged in line horizontally with said hot chamber, an inlet port leading from the lower end of the cool chamber to the hot chamber, a return port leading from the upper part of the hot chamber to the cool chamber, a ball valve at the lower part of the cool chamber and between said ports, and electro-magnetic means thermostatically controlled for operating said ball valve, substantially as described.

12. In apparatus according to claim 1, in which the cool chamber is in the form of a column with a vertical bore at the lower end of which the valve is located, substantially as described.

13. In combination a heat dominating valve, a hot chamber having an actuating expansible wall, a cool chamber connected with the hot chamber, and an electro-magnetically operated valve controlled by a thermostat for opening the connection between the cool chamber and the hot chamber for supplying the latter with volatile fluid, substantially as described.

14. In combination in apparatus of the class described, a valve member, a hot chamber having a diaphragm, a cool chamber, and valve controlling the supply of volatile fluid from the cool chamber to the hot chamber, said diaphragm operating with a snap action to close and open the valve, substantially as described.

15. In a heat dominating valve, a sealed composite pressure chamber, an external cooled compartment of said chamber acting as a condensor, a heated compartment of said chamber acting as a vaporizer, a connection between said compartments below the liquid level for the flow of liquid by gravity from the cooled to the heated compartment, an elevated connection between the said compartments for the passage of vapor from the heated to the cooled compartment and an expanding power transmitting diaphragm connected to and actuated by variations in pressure of said chamber, said diaphragm being so formed and applied as to offer greater resistance to the internal pressure of said chamber when nearly collapsed than when nearly expanded.

16. Apparatus according to claim 9, in which each of the thermostatic circuit closers at the return connections cuts out the said common circuit closer, and cuts in the battery direct to the electro-magnetic means upon a rise of temperature to a prescribed degree at the said return connection, and in which the common circuit closer is normally in circuit through the said individual thermostats, substantially as described.

17. In combination with a radiator having a steam inlet valve and a return fitting, electro-magnetic means controlling said valve, a thermostatic chamber mounted externally in respect to and communicating with said return fitting, said thermostatic chamber forming a dead end and receiving steam from said fitting only when the air in said dead end chamber is displaced by said steam, a thermostat intimately and thermally associated with said dead end chamber, and a circuit controlled by said thermostat, said electro-magnetic means being in said circuit, substantially as described.

18. Apparatus according to claim 17 in which the thermostat is on the outside of said dead end chamber.

19. In combination with a radiator having a steam inlet valve and a return fitting, electro-magnetic means controlling said inlet valve, a thermostatic chamber composed of material of relatively low heat conductivity communicating with said return fitting and externally disposed relative thereto and forming a dead end, a thermostat arranged on the outside of said dead end chamber but in intimate thermal association therewith and a circuit controlled by said thermostat, said electro-magnetic means being in said circuit, substantially as described.

In testimony whereof, I affix my signature.

EDWARD S. HALSEY.